United States Patent [19]

Coquard et al.

[11] Patent Number: 4,740,582

[45] Date of Patent: Apr. 26, 1988

[54] HOMOGENEOUS, FLEXIBLE BLOCK COPOLYETHERAMIDE HAVING OXYALKYLENE UNITS

[75] Inventors: Jean Coquard, Craponne; Jean Goletto, Ecully, both of France

[73] Assignee: Rhone-Poulenc Specialites Chimiques, Courbevoie, France

[21] Appl. No.: 845,710

[22] Filed: Mar. 28, 1986

[30] Foreign Application Priority Data

Mar. 28, 1985 [FR] France ............................... 85 04954

[51] Int. Cl.$^4$ ............................................. C08G 69/34
[52] U.S. Cl. .............................. 528/339.3; 525/420.5; 525/432; 528/336; 528/338; 528/339; 528/340
[58] Field of Search .................... 528/339.3, 338, 339, 528/340, 336; 525/420.5, 432

[56] References Cited

U.S. PATENT DOCUMENTS

| | | | |
|---|---|---|---|
| 3,499,853 | 3/1970 | Griebsch et al. | 260/18 |
| 4,062,820 | 12/1977 | Mitchell, III et al. | 260/18 N |
| 4,218,351 | 8/1980 | Rasmussen | 528/339.3 |
| 4,356,300 | 10/1982 | Isler et al. | 528/339.3 |
| 4,452,974 | 6/1984 | Goletto et al. | 528/339.3 |

FOREIGN PATENT DOCUMENTS

WO81/00719 3/1981 PCT Int'l Appl. .

*Primary Examiner*—Harold D. Anderson
*Attorney, Agent, or Firm*—Burns, Doane, Swecker & Mathis

[57] ABSTRACT

Novel, homogeneous and flexible block copolyetheramides, having a melting point of at least 150° C., a glass transition temperature not exceeding −5° C. and a melt viscosity of at least 100 poises, are preferably prepared by prepolymerizing a mixture of a salt of a short-chain aliphatic dicarboxylic acid and a short-chain aliphatic diamine with a fatty acid(s) dimer or amino derivative thereof, and then polycondensing the prepolymer in the presence of a strong organic or inorganic oxyacid, with a polyoxyalkylenediamine or a polyoxyalkylenedicarboxylic acid having a number-average molecular weight ranging from 300 to 1200.

22 Claims, No Drawings

HOMOGENEOUS, FLEXIBLE BLOCK COPOLYETHERAMIDE HAVING OXYALKYLENE UNITS

BACKGROUND OF THE INVENTION

1. Field of the Invention

The present invention relates to homogeneous, flexible block copolyetheramides prepared from (1) monomers which produce crystalline amide blocks (short-chain dicarboxylic acids and short-chain aliphatic diamines), (2) polymeric diacids or amino derivatives of polymeric diacids, and (3) polyoxyalkylenediamines or polyoxyalkylenedicarboxylic acids.

2. Description of the Prior Art

In certain plastics applications there is a need for polymers which have a set of chemical and physical properties which are partly characteristic of the polyamides. It may be necessary to add the requisite of flexibility to the chemical resistance and to the good heat behavior properties of the conventional polyamides obtained by polycondensation of short-chain saturated aliphatic dicarboxylic acids with short-chain saturated primary aliphatic diamines. Many copolymers have been suggested for this purpose, but the required combination of properties is rarely obtained.

U.S. Pat. No. 4,218,351 describes copolyetheramides containing crystalline amide blocks (capable of conferring the required good thermal behavior properties) produced from short-chain dicarboxylic acids and short-chain diamines, which are capable of having a good flexibility, especially at low temperature. These copolyetheramides are obtained by direct reaction (1) of a mixture of a short-chain dicarboxylic acid and a short-chain diamine with (2) a fatty acid dimer or an amino derivative of a fatty acid dimer and with (3) a polyoxyalkylenediamine or a polyoxyalkylenedicarboxylic acid. However, when following the teachings of this patent it was found that the copolymers thus obtained have the drawback of not being homogeneous, the detrimental consequences of which being on the one hand, the development of properties which do not attain the required high values which are compatible with the use of copolymers as technical plastics and, on the other hand, a great difficulty in providing for the production of highly reproducible shaped articles.

SUMMARY OF THE INVENTION

Accordingly, a major object of the present invention is the provision of a novel class of homogeneous, flexible block copolyetheramides incorporating crystalline amide blocks originating from short-chain dicarboxylic acids and from short-chain diamines.

Briefly, the present invention features novel block copolyetheramides, prepared from short-chain dicarboxylic acids, from short-chain diamines, from polymeric diacids or from amino derivatives thereof and from polyoxyalkylenediamines or polyoxyalkylenedicarboxylic acids, having, in particular, a melting or softening point of at least 150° C., a glass transition temperature, measured at ZHE, not exceeding −5° C. and a melt viscosity, measured under conditions defined hereinafter, of at least 100 poises, said novel copolyetheramides being characterized in that they are homogeneous and in that they are produced in accordance with the following operating procedure:

(1) in a first step, a prepolymer is prepared by heating reactants comprising:
 (i) either of a mixture of the following species:
  (a) at least one short-chain saturated aliphatic dicarboxylic acid,
  (b) optionally at least one short-chain dicarboxylic acid of a saturated alicyclic or aromatic type,
  (c) at least one short-chain saturated primary aliphatic diamine, and
  (d) at least one polymeric diacid or (d') at least one amino derivative of a polymeric diacid or (e') at least one polyoxyalkylenedicarboxylic acid,
 the proportions of the reactants (a), and optionally (b) and (c) being selected such that the numbers of $NH_2$ and COOH groups are equivalent,
 (ii) or of the mixture of at least one salt derived from the reactants (a)+optionally (b)+(c) with the reactant (d) or (d') or (e');

(2) then, in a second step, the prepolymer, which is maintained at a temperature at least equal to the prepolymerization temperature, is reacted:
 (i) either, in the event that the prepolymer is prepared from polymeric diacid(s) (d), with (e) at least one polyoxyalkylenediamine,
 (ii) or, in the event that the prepolymer is prepared from amino derivative(s) of polymeric diacid(s) (d'), with (e') at least one polyoxyalkylenedicarboxylic acid,
 (iii) or, in the event that the prepolymer is prepared from polyoxyalkylenedicarboxylic acid(s) (e'), with (d') at least one amino derivative of a polymeric diacid;

said reaction being carried out, for a sufficient period of time to provide a copolymer having the required properties, in the presence of a catalyst (f) comprising either a compound (alpha), or of a compound (beta), (alpha) denoting an inorganic oxyacid or an organic oxyacid other than a carboxylic acid, in which at least one of the acid functions thereof, when there are a plurality of same, has an ionization constant $pK_a$ in water at 25° C. not exceeding 4, (beta) denoting an alkali metal or alkaline earth metal salt of this acid;

the reactant containing ether bridges (e) or (e') comprising:
 (i) either of one or more polyoxyalkylenediamine(s) or of one or more polyoxyalkylenedicarboxylic acid(s), each having, on the one hand, a number-average molecular weight which is in the range of from 300 to 1200 and, on the other hand, at most 20% by weight of the polymer chains thereof having a molecular weight greater than 1200,
 (ii) or of a mixture of one or more polyoxyalkylenediamine(s) or of one or more polyoxyalkylenedicarboxylic acid(s) such as specified under (i) with at most 20% by weight relative to the mixture, respectively, of one or more polyoxyalkylenediamine(s) or of one or more polyoxyalkylenedicarboxylic acid(s), each having a number-average molecular weight greater than 1200, the proportions of the suitable reactant (e) or (e') or (d') being selected in relation to the proportions of the reactants employed in the first step such that the number of $NH_2$ and COOH groups present in the reaction mixture in the second step are equivalent.

The present invention also features block copolyetheramides having the aforementioned properties, characterized in that they are homogeneous and are prepared in accordance with the following operating procedure:

(4) in a first step, a prepolymer is prepared by heating reactants comprising the following mixtures:

| | |
|---|---|
| ($m_1$) either: | (a) at least one short-chain saturated aliphatic dicarboxylic acid, (b) optionally at least one short-chain dicarboxylic acid of a saturated alicyclic or aromatic nature, (d) at least one polymeric diacid, and (e) at least one polyoxyalkylenediamine, |
| ($m_2$) either: | the abovementioned reactant (a), optionally the abovementioned reactant (b), (d') at least one amino derivative of a polymeric diacid, and (e') at least one polyoxyalkylenedicarboxylic acid, |
| ($m_3$) either: | optionally the abovementioned reactant (b), (c) at least one short-chain saturated primary aliphatic diamine, the abovementioned reactant (d), and the abovementioned reactant (e), |
| ($m_4$) either: | optionally the abovementioned reactant (b), the abovementioned reactant (c), the abovementioned reactant (d'), and the abovementioned reactant (e'), | with the proportions of reactants (d), (e) and optionally (b) or (d'), (e') and optionally (b) being selected such that the numbers of $NH_2$ and COOH groups are equivalent;

(2) then, in a second step, the prepolymer, maintained at a temperature which is at least equal to the prepolymerization temprature, is reacted:
(i) either, in the event that the prepolymer is prepared from the mixtures ($m_1$) or ($m_2$), with the abovementioned reactant (c),
(ii) or, in the event that the prepolymer is prepared from the mixtures ($m_3$) or ($m_4$), with the abovementioned reactant (a);
said reaction being carried out for a sufficient period of time to provide a copolymer having the required properties, in the presence of a catalyst (f) comprising either a compound (alpha), or of a compound (beta), (alpha) denoting an inorganic oxyacid or an organic oxyacid other than a carboxylic acid, in which at least one of the acid groups thereof, when there are a plurality of same, has an ionization constant $pK_a$ in water at 25° C. which does not exceed 4, (beta) denoting an alkali metal or alkaline earth metal salt of this acid;
the ether-bridged reactant (e) or (e') comprising: (i) either one or more polyoxyalkylenediamine(s) or one or more polyoxyalkylenedicarboxylic acid(s), each having, on the one hand, a number-average molecular weight in the range from 300 to 1200 and, on the other hand, not more than 20% by weight of the polymer chains thereof having a molecular weight greater than 1200,
(ii) or of a mixture of one or more polyoxyalkylenediamine(s) or of one or more polyoxyalkylenedicarboxylic acid(s) such as defined under (i) with at least 20% by weight relative to the mixture, respectively, of one or more polyoxyalkylenediamine(s) or of one or more polyoxyalkylenedicarboxylic acid(s), each having a number-average molecular weight greater than 1200,
the proportions of the suitable reactant (c) or (a) being selected in relation to the proportions of the reactants used in the first step such that the number of $NH_2$ and COOH groups present in the reaction mixture in the second step are equivalent.

DETAILED DESCRIPTION OF THE PREFERRED EMBODIMENTS OF THE INVENTION

More particularly according to the present invention, by "homogeneous copolyetheramide" there is intended a copolymer exhibiting only one phase in the molten state. A means for establishing this homogeneity consists in observing the state of transparency state of a molten mass approximately 0.2 to 0.5 cm in thickness, heated to a temperature at least 10° C. above its melting point.

Among the homogeneous copolyetheramides, there may be distinguished:

(I) copolyetheramides exhibiting a single amorphous phase in the solid state, which, after fixing with phosphotungstic acid, are found to be perfectly uniform by means of scanning electron microscopy at magnifications of up to 30,000. Films or small-diameter rods obtained by rapidly cooling these polymers are transparent, (II) copolyetheramides exhibiting a separation into microregions when solidifying, in which, after fixing with phosphotungstic acid, scanning electron microscopy reveals a microphase dispersed as inclusions of a size which is generally below 2000 Å. Films or small-diameter rods obtained by rapid cooling of these polymers are translucent or "milky".

In contrast, the heterogeneous copolyetheramides such as are obtained by the process described in U.S. Pat. No. 4,218,351, appear as cloudy or white opaque masses in the molten state and, in the solid state, after fixing with phosphotungstic acid, show under scanning electron microscopy heterogeneities, the dimensions of which range from approximately 1 $\mu$m to tens of or even several hundred $\mu$m.

The short-chain saturated aliphatic dicarboxylic acids (a) within the scope of the invention defined above are typically compounds containing from 2 to 12 carbon atoms. Exemplary of suitable diacids (a), representative are: succinic acid, glutaric acid, adipic acid, pimelic acid, suberic acid, azelaic acid, sebacic acid, and dodecanedioic acid.

The alicyclic or aromatic dicarboxylic acids (b) within the scope of the invention defined above are compounds containing at most 16 carbon atoms. Exemplary of suitable diacids (b), representative are: 1,4-cyclohexanedicarboxylic acid, terephthalic acid, and isophthalic acid. The proportions of short diacids (a), in the mixtures of short diacids (a)+(b) which may be employed, usually represent at least 60 mole %.

The short-chain saturated primary aliphatic diamines (c) within the scope of the invention defined above are typically compounds which also contain from 2 to 12 carbon atoms. Exemplary of suitable diamines (c), representative are: ethylenediamine, hexamethylenediamine, octamethylenediamine and dodecamethylenediamine.

The homogeneous copolyetheramides having the properties stated above have been described as being prepared by a process which has to be carried out in two steps [prepolymerization and reaction of the prepolymer with the reactant (e) or (e') or (d') or (c) or (a)] and specifying the use of a particular ether-bridged reactant (e) or (e') and of a particular catalyst. When using either diacids (a) comprising saturated aliphatic carboxylic acids containing from 8 to 12 carbon atoms [the diamines (c) then being saturated primary aliphatic diamines containing from 2 to 12 carbon atoms], or diamines (c) comprising saturated primary aliphatic diamines containing from 8 to 12 carbon atoms [the diacids (a) then being saturated aliphatic dicarboxylic acids containing from 2 to 7 carbon atoms], it has been found that the use of a two-step process is no longer obligatory and that a single-step process is sufficient. The present invention consequently also features block copolyetheramides having the properties stated above, characterized in that they are homogeneous and are prepared in accordance with the following operating procedure;

the mixture comprising the following materials is reacted directly by heating, for a sufficient period of time to provide a copolymer having the required properties:

| either: | (a') at least one saturated aliphatic dicarboxylic acid containing from 8 to 12 carbon atoms, <br> (b) optionally at least one short-chain dicarboxylic acid of a saturated alicyclic or aromatic nature, <br> (c') at least one saturated primary aliphatic diamine containing from 2 to 12 carbon atoms, <br> (d) at least one polymeric diacid or (d'), at least one amino derivative of a polymeric diacid, <br> (e) at least one polyoxyalkylenediamine in the event that a reactant (d) is used or <br> (e') at least one polyoxyalkylenedicarboxylic acid in the event that a reactant (d') is used, and <br> (f) a catalyst comprising either the compound (alpha), or the compound (beta) which are defined above, |
|---|---|
| or: | (a'') at least one saturated aliphatic dicarboxylic acid containing from 2 to 7 carbon atoms, optionally the abovementioned reactant (b), <br> (c'') at least one saturated primary aliphatic diamine containing from 8 to 12 carbon atoms, and <br> the abovementioned reactants (d) or (d'), (e) or (e') and the catalyst (f), |
| or: | at least one salt derived from reactants (a), optionally (b) and (c') or at least one salt derived from reactants (a''), optionally (b) and (c'') and the abovementioned reactants (d) or (d'), (e) or (e') and the catalyst (f); <br> - the ether-bridged reactant (e) or (e') |
| comprises: | |

(i) either one or more polyoxyalkylenediamine(s) or one or more polyoxyalkylenedicarboxylic acid(s), each having, on the one hand, a number-average molecular weight in the range from 300 to 1200 and, on the other hand, at most 20% by weight of the polymer chains having a molecular weight greater than 1200, (ii) or of a mixture of one or more polyoxyalkylenediamine(s) or of one or more polyoxyalkylenedicarboxylic acid(s) such as defined under (i) with at most 20% by weight relative to the mixture, respectively, of one or more polyoxyalkylenediamine(s) or of one or more polyoxyalkylenedicarboxylic acid(s), each having a number-average molecular weight greater than 1200;

the proportions of the various reactants employed are selected such that the number of $NH_2$ and COOH groups present in the reaction mixture are equivalent.

It should be understood that the proportions of the short diacids (a') or (a''), in the mixtures of diacids (a')+(b) or (a'')+(b) which may be employed, also represent at least 60 mole % in this case.

The polymeric diacids (d) within the scope of the present invention are principally fatty acid dimers. In general, these dimer acids are obtained by polymerization of compounds comprising 80 to 100% by weight of monomeric fatty acid(s) containing from 16 to 20 carbon atoms and 20 to 0% by weight of monomeric fatty acid(s) containing from 8 to 15 carbon atoms and/or from 21 to 24 carbon atoms. By "monomeric fatty acids" are intended saturated or unsaturated, straight-chain or branched aliphatic monoacids.

Exemplary of the saturated straight-chain or branched monomeric fatty acids, representative are: caprylic, pelargonic, capric, lauric, myristic, palmitic and isopalmitic, stearic, arachidic, behenic and ligноceric acids.

Exemplary of the straight-chain or branched monomeric fatty acids containing ethylenic unsaturation(s), representative are: 3-octenoic, 11-dodecenoic, oleic, lauroleic, myristoleic, palmitoleic, gadoleic, cetoleic, linoleic, linolenic, eicosatetraenoic and chaulmoogric acids. Some acids containing acetylenic unsaturation may also result in polymeric acids, but they do not exist in interesting amounts in the natural state and consequently their economic interest is very low.

The polymeric fatty acids obtained by thermal polymerization, optionally in the presence of catalysts such as peroxides or Lewis acids, may be fractionated, for example, using conventional vacuum-distillation or solvent extraction techniques. They may also be hydrogenated to reduce their degree of unsaturation and thereby to reduce their color.

The dimer acids preferably employed in the present invention are fractionated polymeric fatty acids in which the difunctional acid fraction is greater than 94% by weight, the monofunctional acid fraction is below 1% by weight, and still more preferably equal to or below 0.5% by weight, the fraction containing acid of functionality greater than 2 is below 5% by weight and still more preferably equal to or below 3% by weight.

The dimer acids which are still more preferably employed are the species produced by fractionation (resulting in the fractions stated above) of polymeric fatty acids which have in addition been subjected to hydrogenation.

The polymeric diacids (d) within the scope of the present invention may also be diacids obtained by reaction of at least one straight-chain or branched unsaturated monocarboxylic acid containing from 3 to 8 carbon atoms, with at least one straight-chain or branched unsaturated monomeric fatty acid, the diacid produced in the reaction containing more than 18 carbon atoms. By way of example, there may be mentioned the diacid containing 21 carbon atoms, obtained by the reaction of acrylic acid with oleic acid.

Concerning the amino derivatives (d') of polymeric diacids, these may be prepared in a manner known per se, for example, by the reaction of the acid groups of the polymeric diacid with ammonia, to form a nitrile which is then reduced to a primary diamine.

The other reactants employed in the present invention comprise polyoxyalkylenediamines (e) or polyoxyalkylenedicarboxylic acids (e'). More precisely, these compounds comprise:

the compounds represented by the general formula:

$$X-R_1-(OR_2)_n-OR_3-X \quad (I)$$

in which:

the symbols X denote a NH$_2$ group or a COOH group, the symbols $R_1$, $R_2$ and $R_3$, which are identical or different, denote straight-chain or branched divalent saturated aliphatic radicals containing from 1 to 10 carbon atoms, the symbol n is a number determined such as to provide ether-bridged compounds having the molecular weight specifications stated above in points (i) and (ii) in respect of these compounds;

as well as the compounds obtained by the reaction of a polyoxyalkylenediamine of formula (I) with a deficiency of a polymeric diacid (d) or of a polyoxyalkylenedicarboxylic acid of formula (I), and, further, as well as the compounds obtained by the reaction of polyoxyalkylenedicarboxylic acid of formula (I) with a deficiency of an amino derivative (d') of a polymeric diacid or of a polyoxyalkylenediamine of formula (I), the said reaction products obtained having the molecular weight specifications indicated above in points (i) and (ii).

By way of illustration of polyoxyalkylenediamines (e) which are suitable, representative are, for example: polyoxypropylenediamines of the formula (I) in which polyoxypropylenediamines of the formula (I) in which X = NH$_2$, and $$R_1 = R_2 = R_3 = -\overset{CH_3}{\underset{|}{CH}}-CH_2-,$$

polyoxyethylenediamines of the formula (I) in which X = NH$_2$, and $$R_1 = R_3 = -\overset{CH_3}{\underset{|}{CH}}-CH_2- \text{ and } R_2 = -CH_2-CH_2,$$

or polyoxytetramethylenediamines of the formula (I) in which $$X = NH_2, R_1 = R_3 = -\overset{CH_3}{\underset{|}{CH}}-CH_2- \text{ and}$$

$$R_2 = -CH_2-CH_2-CH_2-CH_2-.$$

As an illustration of polyoxyalkylenedicarboxylic acids (e') which are suitable, representative are, for example, the compounds of the formula (I) with X=COOH, in which the symbols $R_1$, $R_2$ and $R_3$ are as defined above.

With regard to the strong inorganic or organic oxyacid (alpha) which is used as a catalyst (f), use is made, as indicated above, of an oxygen-containing mono- or polyacid in which at least one of the acid functions thereof has an ionization constant pK$_a$ in water at 25° C. which does not exceed 4.

As strong acids which are suitable, representative are, for example:

among the inorganic oxyacids: sulfurous, sulfuric, hypophosphorous, phosphorous, orthophosphoric or pyrophosphoric acids;

among the organic oxyacids:

the organosulfonic acids of the formula R$_4$—SO$_3$H (II) in which R$_4$ denotes: a straight-chain or branched alkyl radical containing from 1 to 6 carbon atoms; a phenyl radical optionally substituted by 1 to 3 alkyl radicals containing from 1 to 3 carbon atoms; a phenylalkyl radical containing from 1 to 3 carbon atoms in the alkyl moiety and in which the benzene nucleus may optionally be substituted by 1 to 3 alkyl radicals containing from 1 to 3 carbon atoms; or a naphthyl radical optionally substituted by 1 to 4 alkyl radicals containing from 1 to 3 carbon atoms;

the organophosphonic acids of the formula R$_5$—P-(O)—(OH)$_2$ (III) in which R$_5$ denotes an alkyl radical, a phenyl radical or a phenylalkyl radical, each of these radicals having the definition given above for R$_4$;

the organophosphinic acids of the formula R$_6$R$_7$—P-(O)(OH) (IV) in which R$_6$ and R$_7$, which are identical or different, each denote: a straight-chain alkyl radical containing from 1 to 3 carbon atoms; a phenyl radical or a phenylalkyl radical, both of these latter radicals having the definition given above for R$_4$;

the organophonous acids of formula R$_8$H—P(O)-(OH) (V) in which R$_8$ denotes: a straight-chain or branched alkyl radical containing from 1 to 4 carbon atoms (branching being excluded for an alkyl radical containing 4 carbon atoms); a phenyl radical or a phenylalkyl radical, both of these two latter radicals having the definition given above for R$_4$.

Acids derived from phosphorus are preferably employed as a strong acid (alpha), and more particularly hypophosphorous, phosphorous, orthophosphoric, pyrophosphoric, methylphosphonic, phenylphosphonic, benzylphosphonic, dimethylphosphinic, diphenylphosphinic, methylphenylphosphinic, dibenzylphosphinic, methylphosphonous, phenylphosphonous or benzylphosphonous acids.

Concerning the acid salt (beta), representative are alkali metal or alkaline earth metal salts derived from inorganic or organic oxyacids (alpha).

It is preferred to use as a salt (beta) those which are completely soluble in the reaction mixture. Among these preferred salts (beta), the sodium and potassium salts derived from the particular types of suitable inorganic or organic oxyacids (alpha) mentioned above, are suitable. The salts (beta) which are most particularly suitable are sodium and potassium salts derived from the preferred acids derived from phosphorus and mentioned by name above.

The proportions of strong acid (alpha) or of salt (beta), expressed as a weight percentage relative to the final copolyetheramide, generally range from 0.01 to 1% and preferably from 0.01 to 0.5%.

The preferred copolyetheramides according to the present invention comprise:

the copolymers obtained in two steps derived from a prepolymer prepared from the reactants (a)+optionally (b)+(c)+(d) or (d') or (e'), and the copolymers obtained in a single step from the reactants (a') or (a")+optionally (b)+(c') or (c")+(d) or (d')+(e) or (e').

Among the copolyetheramides belonging to this preferred group, those which are especially preferred are the copolymers prepared in two steps or in a single step from the reactant (a) or (a') or (a")+(c) or (c') or (c″)+(d) or (d′)+(e) or (e′), the reactants (d) or (d′) and (e) or (e′) having the following specifications:

(d) denotes a dimer acid obtained by fractionation of a hydrogenated composition produced by catalytic polymerization of monomeric fatty acid(s) containing 18 carbon atoms; in this context, because of their ready availability and their relatively straightforward polymerization, oleic, linoleic and linolenic acids, taken separately or in pairs or in the form of a ternary mixture, are the starting products which are most especially preferred for the preparation of the dimer acid;

(d′) denotes a dimeric diamine obtained from the particular dimer acid noted in the preceding paragraph;

(e) or (e′) denote:
(i′) either a polyoxyethylenediamine, a polyoxypropylenediamine, a polyoxytetramethylenediamine or a polyoxyethylenedicarboxylic acid, a polyoxypropylenedicarboxylic acid, a polyoxytetramethylenedicarboxylic acid such as defined above, each of these compounds having, on the one hand, a number-average molecular weight ranging from 400 to 1000 and, on the other hand, at most 10% by weight of polymer chains having a molecular weight greater than 1000,
(ii′) or a mixture of one of the polyoxyalkylenediamines or of one of the polyoxyalkylenedicarboxylic acids such as defined under (i′) with at most 10% by weight relative to the mixture, respectively, of the same polyoxyalkylenediamine or of the same polyoxyalkylenedicarboxylic acid but having a number-average molecular weight greater than 1200 and not exceeding 10,000.

Among the copolyetheramides belonging to this specially preferred group, those which are most specially suitable are the copolymers prepared from combinations of reactants (a) or (a′) or (a″)+(c) or (c′) or (c″) which are as follows:

(a)+(c): adipic acid+hexamethylenediamine,
(a′)+(c′): azelaic acid or dodecanedioic acid+hexamethylenediamine,
(a″)+(c″): adipic acid+dodecamethylenediamine, these various compounds being used in the free state or in the form of their salt.

Concerning the manner in which the copolyetheramides according to the present invention are prepared and more precisely concerning the two-step operational procedure, it should be noted that the preparation of the prepolymer is typically carried out by heating the combined reactants to a selected temperature in the range from 220° to 300° C., while operating under atmospheric pressure or under a higher pressure for a variable period ranging, for example, from 10 minutes to 4 hours and while removing the water present in the reaction mixture by steady distillation such as to ensure a degree of amidification at least equal to 80% of the maximum possible degree of amidification with the reactants employed. In the case of the preferred copolyetheramides featured above, the prepolymers are advantageously prepared from the mixture of salt(s) derived from the reactants (a)+optionally (b)+(c) with the reactant (d) or (d′) or (e′); the stoichiometry of the salt(s) may be monitored and adjusted by measuring the pH of specimen solutions obtained by dissolving the salt(s) in a suitable solvent. Before continuing to the next step, it may be advantageous to apply a reduced pressure such as to gradually attain a value below $50.10^2$ Pa and to maintain the reaction mixture at this reduced pressure at the prepolymerization temperature for a period of time ranging, for example, from 5 minutes to 1 hour, atmospheric pressure then being restored.

The copolyetheramides according to the present invention are prepared by gradually pouring into the prepolymer to which the catalyst (f) has been added and which has been maintained at the prepolymerization temperature selected for conducting the first step, or heated to a higher temperature which, however, should not exceed 300° C., all of the suitable reactant [that is to say, (e) or (e′) or (d′) in the case of the aforesaid preferred copolyamides] which is required for stoichiometry purposes. This operation is carried out under atmospheric pressure. According to another operating procedure, it is possible to gradually pour into the prepolymer a quantity of the suitable reactant which is deficient by approximately 5 to 30% by weight relative to the quantity theoretically required for stoichiometry purposes. After the complete or partial pouring, stirring of the reaction mixture can be continued at the abovementioned temperature and under atmospheric pressure for a variable period ranging, for example, from 10 minutes to 1 hour. The reaction is then completed by applying a reduced pressure such as to gradually attain a value below $200.10^2$ Pa and by ending where applicable, the addition of the suitable reactant while it is deficient, to attain stoichiometry, the temperature being maintained at the abovementioned value and the duration of this last step being capable of varying, for example, from 10 minutes to 2 hours.

Concerning the single-step operating procedure, it should be noted that the preparation of the copolyetheramides according to the present invention is generally carried out by directly heating the combination of the reactants (a′) or (a″)+optionally (b)+(c′) or (c″)+(d) or (d′)+(e) or (e′) in the presence of the catalyst (f) to a temperature ranging from 220° C. to 300° C., while operating under atmospheric pressure or under a higher pressure for a period ranging, for example, from 10 minutes to 3 hours and while removing the water present in the reaction mixture by steady distillation. The polycondensation is then completed by applying a reduced pressure such as to gradually attain a value below $200.10^2$ Pa, the temperature being maintained at a value equal or close to the abovementioned temperature, the duration of this reduced-pressure phase being capable of varying, for example, from 10 minutes to 2 hours.

The copolyetheramides according to the present invention may, naturally, be modified by the addition, for example, to the mixture in which they are prepared, of one or more additives such as, particularly: stabilizers and inhibitors of degradation by oxidation, by ultraviolet, by light or by heat; lubricants; colorants; nucleating agents; antifoam agents, inorganic additives or reinforcing fillers.

In the copolyetheramides according to the present invention, crystallinity, and consequently the cohesion and the capacity for obtaining high melting points and good retention of the mechanical properties as a function of temperature, are contributed by the amide blocks; the amide blocks are intended to denote essentially the combination of segments derived from the condensation of the molecules of short diacid(s), (a) or (a′) or (a″)+optionally (b), with the molecules of short diamine(s) (c) or (c′) or (c″). The possibility of obtaining a $T_g$ which is as low as possible, and consequently the capacity for having high flexibility and elasticity are contributed by the ether blocks; the ether blocks are intended to denote essentially the combination of segments derived from the condensation, either of the molecules of polymeric diacid(s) (d) with the molecules of polyoxyalkylenediamine(s) (e), or of the molecules of amine(s) derived from the polymeric diacid(s) (d') with the molecules of polyoxyalkylenedicarboxylic acid(s) (e').

The flexibility and the elasticity of the polymer obtained may be varied over wide limits by modifying the respective proportions of the amide blocks and of the ether blocks in the final copolyetheramide. Where crystallinity, flexibility and elasticity are concerned, a good compromise may be found for weight proportions of amide blocks in the final polymer of between 15 and 85% and preferably between 40 and 60% and for weight proportions of ether blocks of between 85 and 15% and preferably between 60 and 40%. The quantities of reactants employed are, of course, determined such as to provide a copolyetheramide having such weight proportions of amide blocks and of ether blocks; to calculate these weight proportions, it is considered that the amide blocks and the ether blocks are derived from the diacids and the diamines by the loss of one mole of water per COOH group reacting with a $NH_2$ group.

It has thus unexpectedly been found that to have both homogeneous copolymers and the good compromise just described, it is necessary:

in the case where short diacids (a) containing from 2 to 7 carbon atoms and short diamines (c) containing from 2 to 7 carbon atoms are employed at the outset, to conduct the polycondensation of the reactants in two steps [prepolymerization and reaction of the prepolymer with the suitable reactant (e) or (e') or (d') or (c) or (a)], and, whatever the nature of the short diacids (a) or (a') or (a") and of the short diamines (c) or (c') or (c") employed, to use a particular ether-bridged reactant (e) or (e') having the special specifications concerning molecular weight which are indicated above.

Finally, the copolyetheramides obtained have good thermal resistance and mechanical strength which are due to their high melting points, ranging from 150° C. to approximately 280° C. They have a $T_g$, measured at ZHE, which can attain values below $-50°$ C., which endows them with a flexibility and elasticity (capable of being regulated by varying the proportions of ether blocks) which can be maintained at temperatures as low as those between $-20°$ C. and $-40°$ C. Their high melt viscosity, measured under the conditions defined below, which can readily be adjusted between 100 poises and over 5,000 poises, also endows them with an excellent suitability for injection and extrusion molding. In addition, being perfectly homogeneous, they exhibit improved transparency properties. Various applications which rely on the specific qualities of these copolyetheramides may be envisaged in fields as diverse as the mechanical industries, building, the automobile industry and household appliances.

In order to further illustrate the present invention and the advantages thereof, the following specific examples are given, it being understood that same are intended only as illustrative and in nowise limitative.

A number of control measurements were carried out in these examples. Similarly, various properties were measured. The operating procedures and/or the standards according to which these controls and measurements were carried out are indicated below.

Microcalorimetric analysis:

The polymers were characterized by melting characteristics such as the melting endotherms $E_f$ and the crystallization exotherms $E_c$.

These determinations were made on a specimen subjected to both rising and falling temperature changes at a rate of 10° C./min. A differential microcalorimetry curve was thus determined, on which it was possible to locate the melting $(T_f)$ and crystallization on cooling $(T_c)$ points. The difference between $T_f$ and $T_c$ constitutes the supercooling $\Delta$ which characterizes nucleation.

Glass transition:

The glass transition temperature $(T_g)$ corresponds to the abrupt drop in the shear modulus as a function of temperature. It was determined from the diagram showing the variation of the torsion modulus as a function of temperature, a variation which was measured by thermomechanical analysis using an automatic torsion pendulum.

Torsional shear modulus:

This was determined at two temperatures: at $-20°$ C. and at $+20°$ C., with an automatic torsion pendulum at a frequency of the order of 1 hertz, according to the ISO Standard R 537. The specimens were conditioned at ZHE, that is to say, they were placed over silica gel in a desiccator and dried for 24 hours at ambient temperature at $0.66-1.33.10^2$ Pa before measurements were carried out. The results are expressed in Mpa.

Melt viscosity:

This was measured at 260° C. under a shear gradient of 10 $s^{-1}$ with the aid of a Davenport rheometer. The results are expressed in poises. For copolyetheramides which have a melting point above 255° C., it was measured at a temperature 10° C. above the melting point.

Determination of the end groups in the copolyamide:

The method described below made it possible to estimate both types of end groups with a single test sample and by a single acidimetric titration. The copolyamide was dissolved at ambient temperature, under stirring, in a trifluoroethanol/chloroform mixture. When it had dissolved, an aqueous-alcoholic 0.05N tetrabutylammonium hydroxide solution was added and a potentiometric titration was carried out with a standardized 0.05N hydrochloric acid solution under a stream of nitrogen. The use of a potentiometric curve showing two potential steps made it possible to determine the two types of end groups. The result is given in milligram-equivalents per kilogram of polymer (meq/kg).

In the examples which follow, where the acid dimer employed is concerned, a compound was used marketed by Unichema Chemie under the trademark Pripol 1010 in which the difunctional acid fraction was greater than 95% by weight. This difunctional acid fraction consisted of a mixture of isomers containing 36 carbon atoms in which the predominant species was a saturated compound of the formula:

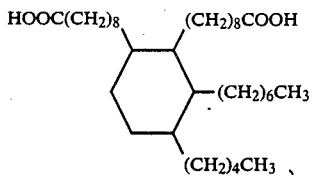

The monofunctional acid fraction (the weight proportion of which will be given later) consisted essentially of oleic acid; as for the fraction of acid having a functionality greater than 2 (the weight proportion of which will also be given later), this consisted essentially of a mixture of isomeric trimers containing 54 carbon atoms; the number-average molecular weight of this dimer acid was on the order of 571.

Where the dimer diamine employed is concerned, a compound was used marketed by General Mills under the trademark Versamine 52. This compound had substantially the same structure as that of Pripol 1010, in which the COOH groups were replaced by $CH_2NH_2$ groups; the number-average molecular weight of this dimer diamine was on the order of 541.

In connection with the method for determining, for the reactants (e) or (e'), the weight fraction of polymer chains which have a molecular weight greater than the values given above, it can be stated that this quantity is determined in a manner known per se from the integration curve represented by the formula:

$$\sum_{i=1}^{i=i} n_i M_i = f(M_i)$$

in which $n_i$ is the number of molecules of molecular weight $M_i$ and which is plotted using gel permeation chromatography analysis, the molecular mass calibration being carried out by taking the value found by estimating the end groups in reactants (e) or (e') as the number-average molecular weight.

EXAMPLE 1

Copolyetheramide prepared from hexamethylenediamine, adipic acid/dimer acid and a polyoxypropylenediamine which had a number-average molecular weight of 455 and contained no polymer chains having a molecular weight greater than 1000, with a weight composition in the region of 50/50 (amide blocks/ether blocks).

The operation was carried out in a glass reactor equipped with:
a heating system using a metal bath (Lipowitz alloy),
a stirrer,
a system permitting blanketing with nitrogen and operation under a pressure below atmospheric pressure,
a circuit permitting the volatile products to be condensed and collected.

1. First step:
The following charges were introduced into the reactor at ambient temperature (23° C.):
dry adipic acid/hexamethylenediamine salt: 34.77 g (0.1326 mole),
Pripol 1010 fatty acid dimer having a monomer content of 0.03% by weight and a trimer content of 3% by weight: 17.3 g (0.0303 mole).

The reactor was purged with a nitrogen stream and then, while it remained under a nitrogen atmosphere, stirring was commenced and the temperature of the reaction mixture was raised gradually up to 270° C. over 45 minutes. Water was distilled off at atmospheric pressure for 30 minutes. A pressure of $6.65.10^2$ Pa was then established gradually over 10 minutes and the reaction mixture was maintained at 270° C. at this reduced pressure for another 10 minutes and then atmospheric pressure was restored. A perfectly transparent reaction mixture was then obtained.

2. Second step:
The following remaining charge was introduced into the reaction mixture which was stirred and maintained at 270° C.:
an antioxidant marketed under the trademark Irganox 1010 by Ciba Geigy: 0.3 g,
hypophosphorous acid in a 50% weight aqueous solution: 0.06 g (0.05% by weight relative to the final copolyetheramide),
then, 13.8 g (0.0303 mole) of a polyoxypropylenediamine which had a number-average molecular weight of 455 and contained no polymer chains having a molecular weight greater than 1000, and which is marketed by BASF under the trademark Etherdiamine MG 420, were added by being steadily poured in over 30 minutes.

When the pouring was completed, a reduced pressure of $106.4.10^2$ Pa was re-established and stirring of the reaction mixture which was perfectly transparent at 270° C. was continued for 15 minutes.

After cooling, a flexible, perfectly transparent and homogeneous polymer was obtained. Examination of this product by scanning electron microscopy confirmed the presence of a single phase.

The polymer obtained had the following characteristics:
Melting point ($T_f$): 231° C.,
Crystallization point on cooling ($T_c$): 189° C.,
Glass transition temperature ($T_g$) at ZHE: −17° C.,
Melt viscosity at 260° C.: 1000 poises,
End group contents:
—$NH_2$: 30 meq/kg
—COOH: 67 meq/kg
Torsional shear modulus:
−20° C.: 700 Mpa
+20° C.: 140 Mpa.

By way of a first comparative test (Test A), Example 1 was reproduced with the same reactants and catalyst, but this time with the polycondensation being carried out in a single step.

By way of a second comparative test (Test B), Example 1 was reproduced, but this time using a polyoxypropylenediamine having a nonconforming number-average molecular weight of 2065.

By way of a third comparative test (Test C), Example 1 was reproduced, but this time using a polyoxyethylenediamine having a nonconforming number-average molecular mass of 2355.

By way of a fourth comparative test (Test D), Example 1 was reproduced, but this time using a polyoxypropylenediamine having a nonconforming number-average molecular mass of 1445.

The amounts of the reactants and catalyst employed in these various tests were slightly different from those corresponding to Example 1, but in every case they were determined such as to produce a copolyetheramide with amide blocks/ether blocks weight composition in the region of 50/50.

TEST A:

The following charges were introduced at ambient temperature into the apparatus described in Example 1:
dry adipic acid/hexamethylenediamine salt: 27.81 g (0.106 mole),
Pripol 1010 fatty acid dimer: 13.84 g (0.0242 mole),
Irganox 1010 antioxidant: 0.240 g,
hypophosphorous acid in a 50% weight aqueous solution: 0.04 g (0.05% by weight relative to the final polymer),
polyoxypropylenediamine Etherdiamine MG 420: 11.04 g (0.0242 mole).

The reactor was purged with a stream of nitrogen, and then, while it remained under a nitrogen atmosphere, stirring was commenced and the temperature of the reaction mixture was raised up to 270° C. A heterogeneous opaque mass was obtained, which remained unchanged after being heated at 270° C. for 1 hour, 15 minutes. A pressure of $26.6.10^2$ Pa was then established gradually over 20 minutes and the reaction mixture was maintained at 270° C. at this reduced pressure for another 20 minutes and atmospheric pressure was restored. The reaction mixture remained opaque and heterogeneous.

After cooling, the polymer obtained was opaque, waxy in appearance and had no mechanical property. Examination by electron microscopy confirmed the existence of major structural heterogeneity.

TEST B:
1. First step:

The following charges were introduced at ambient temperature into the apparatus described in Example 1:
dry adipic acid/hexamethylenediamine salt: 30 g (0.1144 mole),
Pripol 1010 fatty acid dimer: 5.68 g (0.00995 mole).

The reactor was purged with a nitrogen stream, and then, while it remained under a nitrogen atmosphere, stirring was commenced and the temperature of the reaction mixture was raised gradually up to 270° C. over 45 minutes. After 80 minutes of stirring at 270° C., a pressure of $6.65.10^2$ Pa was gradually established over 10 minutes and the reaction mixture was maintained at 270° C. at this reduced pressure for another 10 minutes and then atmospheric pressure was restored.

2. Second step:
The following remaining charges were introduced into the reaction mixture, which was stirred and maintained at 270° C.:
Irganox 1010 antioxidant: 0.26 g,
hypophosphorous acid in 50% weight aqueous solution: 0.052 g (0.05% by weight relative to the final polymer),
then, 20.56 g (0.00995 mole) of a polyoxypropylenediamine which had a number-average molecular weight of 2065 and marketed by BASF under the trademark Etherdiamine 2000, were added by being poured in steadily over 30 minutes.

When pouring was finished, the mass produced was heterogeneous and highly viscous. A reduced pressure of $39.9.10^2$ Pa was established and stirring of the reaction mixture was continued for 15 minutes at 270° C. at this reduced pressure.

After cooling, an opaque polymer was obtained, with a waxy appearance and having no mechanical property.

TEST C:
The operation, using a two-step process, was carried out exactly as indicated in Test B above, but starting with the following charges:
1. First step:
dry adipic acid/hexamethylenediamine salt: 30 g (0.1144 mole),
Pripol 1010 fatty acid dimer: 5.11 g (0.00895 mole).
2. Second step:
Irganox 1010 antioxidant: 0.26 g,
hypophosphorous acid in 50% aqueous solution: 0.052 g,
polyoxyethylenediamine having a number-average molecular weight of 2355, marketed by Texaco under the trademark Jeffamine ED 2001: 21.09 g (0.00895 mole).

Upon completion of pouring of polyoxyethylenediamine the reaction mixture was completely heterogeneous and highly viscous. After returning to ambient temperature, an opaque polymer was obtained, with a waxy appearance and having no satisfactory mechanical properties.

TEST D:
The operation, using a two-step process, was carried out as indicated in Test B above, but starting with the following charges and with some modifications being introduced in the operation:
1. First step:
dry adipic acid/hexamethylenediamine salt: 23.18 g (0.0884 mole),
Pripol 1010 fatty acid dimer: 5.74 g (0.01005 mole).

The reaction temperature was 275° C. and the stirring time of the reaction mixture at atmospheric pressure at this temperature was 40 minutes.

2. Second step:
Irganox 1010 antioxidant: 0.2 g,
hypophosphorous acid in 50% aqueous solution: 0.04 g,
polyoxypropylenediamine having a number-average molecular weight of 1445: 14.52 g (0.01005 mole).

Upon completion of the pouring, the reaction mixture obtained was completely heterogeneous and highly viscous and it was continuously stirred for another 45 minutes at 275° C. before a reduced pressure was established. The latter was restricted to $133.10^2$ Pa and the reaction mixture was stirred at 275° C. at this reduced pressure for another 15 minutes.

After returning to ambient temperature, a white opaque polymer was obtained.

Preparation of polyoxypropylenediamine having a number-average molecular mass of 1445:

This was prepared from the polyoxypropylenediamine Etherdiamine MG 420 which was extended by reaction with a stoichiometric deficiency of dimer acid. 25 g (0.04378 mole) of Pripol 1010 fatty acid dimer and 39.84 g (0.08756 mole) of polyoxypropylenediamine Etherdiamine MG 420 were introduced into a reactor which was identical to that described in Example 1. After the reactor had been purged with a nitrogen stream, the temperature of the mixture was raised gradually up to 200° C. over 30 minutes. After another 30 minutes of stirring at 200° C., a pressure of $39.9.10^2$ Pa was established over 10 minutes and the reaction mixture was maintained for 1 hour at 200° C. at this reduced pressure. The compound obtained, which was perfectly clear, was the required extended diamine.

EXAMPLE 2

Copolyetheramide prepared from hexamethylenediamine, adipic acid/dimer acid and the polyoxypropylenediamine used in Example 1, with a weight composition close to 20/80 (amide blocks/ether blocks):

The operation was carried out exactly as indicated in Example 1 above, but starting with the following charges:

1. First step:
dry adipic acid/hexamethylenediamine salt: 10.43 g (0.0398 mole),
Pripol 1010 fatty acid dimer: 20.75 g (0.0363 mole).

2. Second step:
Irganox 1010 antioxidant: 0.2 g,
hypophosphorous acid in 50% aqueous solution: 0.04 g (0.05% by weight relative to the final copolyetheramide),
polyoxypropylenediamine Etherdiamine MG 420: 16.55 g (0.0363 mole).

When the polycondensation had ended, a very flexible, perfectly transparent and homogeneous polymer was obtained.

EXAMPLE 3

Copolyetheramide prepared from hexamethylenediamine, adipic acid/dimer acid and the polyoxypropylenediamine used in Example 1, with a weight composition close to 80/20 (amide blocks/ether blocks):

The procedure was as indicated in Example 1 above, but starting with the following charges and with some modifications being introduced in operation:

1. First step:
dry adipic acid/hexamethylenediamine salt: 41.73 g (0.1591 mole),
Pripol 1010 fatty acid dimer: 5.19 g (0.00909 mole).
After the temperature rise up to 270° C., the stirring time at atmospheric pressure was increased from 30 minutes to 2 hours 30 minutes.

2. Second step:
Irganox 1010 antioxidant: 0.225 g,
hypophosphorous acid in 50% aqueous solution: 0.045 g (0.05% by weight relative to the final copolyetheramide),
polyoxypropylenediamine Etherdiamine MG 420: 4.13 g (0.00909 mole).

Upon completion of polycondensation a fairly rigid, perfectly homogeneous polymer was obtained. It had a melting point of 252° C. and a crystallization point on cooling of 211° C..

EXAMPLE 4

Copolyetheramide prepared from hexamethylenediamine, adipic acid/dimer acid and a polyoxyethylenediamine which had a number-average molecular weight of 884 and having 8% by weight of chain possessing a molecular mass greater than 1000, with a weight composition close to 50/50 (amide blocks/ether blocks).

The procedure was as indicated in Example 1 above, but starting with the following reactant charges and introducing some modifications in operation:

1. First step:
dry adipic acid/hexamethylenediamine salt: 23.18 g (0.08837 mole),
Pripol 1010 fatty acid dimer: 8.047 g (0.01409 mole).

2. Second step:
Irganox 1010 antioxidant: 0.2 g,
hypophosphorous acid in 50% aqueous solution: 0.04 g (0.05% by weight relative to the final copolyetheramide),
polyoxyethylenediamine marketed by Texaco under the trademark Jeffamine ED 900: 12.46 g (0.01409 mole).

After the pouring of the ether-bridged diamine had ended, the reaction mixture was continuously stirred for 15 minutes at 270° C. before a reduced pressure was established. The latter was restricted to $66.5.10^2$ Pa and the reaction mixture was stirred for another 15 minutes at 270° C. at this reduced pressure.

A flexible, perfectly transparent and homogeneous polymer was obtained. It had a melting point of 236° C. and a crystallization point on cooling of 199° C.

EXAMPLE 5

Copolyetheramide prepared from hexamethylenediamine, adipic acid/dimer acid and a polyoxytetramethylenediamine which had a number-average molecular weight of 432 and 5% by weight of polymer chains possessing a molecular weight greater than 1000, with a weight composition close to 50/50 (amide blocks/ether blocks).

The procedure was as indicated in Example 1 above, but starting with the following reactant charges and introducing some modifications in operation:

1. First step:
dry adipic acid/hexamethylenediamine salt: 23.18 g (0.08837 mole),
Pripol 1010 fatty acid dimer: 10.44 g (0.01828 mole).
After the temperature rise up to 270° C., the stirring time at atmospheric pressure was increased from 30 minutes to 80 minutes.

2. Second step:
Irganox 1010 antioxidant: 0.2 g,
hypophosphorous acid in 50% aqueous solution: 0.04 g (0.05% by weight relative to the final copolyetheramide),
polyoxytetramethylenediamine marketed by BASF under the trademark Bis(3-aminopropyl)polytetrahydrofuran 750, which had been subjected to a fractionation by molecular distillation in order to isolate a compound containing 5% by weight of chains having a molecular weight greater than 1000: 7.90 g (0.01828 mole).

When the pouring of the ether-bridged diamine had ended, a pressure of $39.9.10^2$ Pa was established and stirring of the reaction mixture was continued for 15 minutes at 270° C. at this reduced pressure.

A flexible and homogeneous polymer was obtained, which had a melting point of 228° C. and a crystallization point on cooling of 201° C.

By way of a comparative test (Test E), Example 5 was reproduced, but this time with the use of the polyoxytetramethylenediamine Bis(3-aminopropyl)-polytetrahydrofuran 750 from BASF, which had not been subjected to a fractionation; this crude polyoxytetramethylenediamine had a number-average molecular weight of 825, but its content of polymer chains having a molecular weight greater than 1000 was 30% by weight.

TEST E:

The procedure was exactly as indicated in Example 5, but starting with the following charges:

1. First step:
dry adipic acid/hexamethylenediamine salt: 26.08 g (0.09942 mole),
Pripol 1010 fatty acid dimer: 9.46 g (0.01656 mole).

2. Second step:
Irganox 1010 antioxidant: 0.2 g,
hypophosphorous acid in 50% aqueous solution: 0.04 g,
polyoxytetramethylenediamine Bis(3-aminopropyl)-polytetrahydrofuran 750: 13.63 g (0.01652 mole).

A flexible polymer was obtained. In respect of its morphology, an examination by scanning electron microscopy revealed heterogeneities in the form of particles with dimensions greater than 5 μm, some particles exceeding 10 μm.

EXAMPLE 6

Copolyetheramide prepared from hexamethylenediamine, adipic acid/dimer acid, the polyoxypropylenediamine used in Example 1, with a number-average molecular weight of 455/dimer acid, and the polyoxypropylenediamine used in Test B, of a number-average molecular weight of 2065, with a weight composition close to 50/47/3 (amide blocks/ether blocks of the first type/ether blocks of the second type):

1. First step:

The following charges were introduced at ambient temperature into the apparatus described in Example 1:
dry adipic acid/hexamethylenediamine salt: 23.18 g (0.08837 mole),
Pripol 1010 fatty acid dimer: 11.1 g (0.01944 mole).

The reactor was purged with a nitrogen stream, and then, while it remained under a nitrogen atmosphere, stirring was started and the temperature of the reaction mixture was raised gradually up to 275° C. over 45 minutes. After 40 minutes of stirring at 275° C., a pressure of $6.65.10^2$ Pa was established gradually over 10 minutes and the reaction mixture was maintained for another 10 minutes at 275° C. at this reduced pressure and then atmospheric pressure was restored.

2. Second step:

The following other charges were introduced into the reaction mixture which was maintained at 275° C.:
Irganox 1010 antioxidant: 0.2 g,
hypophosphorous acid in 50% aqueous solution: 0.04 g (0.05% by weight relative to the final copolyetheramide),
then, a mixture consisting of 8.63 g (0.01897 mole) of
polyoxypropylenediamine Etherdiamine MG 420 and of 0.959 g (0.000464 mole) of polyoxypropylenediamine Etherdiamine 2000 was added by being poured in steadily.

Upon completion of the pouring, the reaction mixture was maintained for 10 minutes at 275° C. and then a reduced pressure of $6.65.10^2$ Pa was established and stirring was continued for another 15 minutes at 275° C. at this reduced pressure. The reaction mass was perfectly transparent.

After cooling, a flexible, translucent and perfectly homogeneous polymer was obtained. Only one phase was found during examination by scanning electron microscopy.

The polymer obtained had the following characteristics:
Tf: 229.5° C.
$T_c$: 189° C.
melt viscosity at 260° C.: 1500 poises
end group contents:
 —$NH_2$: 25.25 meq/kg
 —COOH: 16.64 meq/kg
torsional shear modulus:
 −20° C.: 700 Mpa
 +20° C.: 160 Mpa.

By way of a comparative test (Test F), Example 6 above was reproduced, but this time with the use of a quantity of polyoxypropylenediamine Etherdiamine 2000 which represents 30% by weight relative to the mixture of the two polyoxypropylenediamines (this amount was 10% by weight in Example 6).

TEST F

The procedure was exactly as indicated in Example 6, but starting with the following charges:

1. First step:
dry adipic acid/hexamethylenediamine salt: 23.18 g (0.08837 mole),
Pripol 1010 fatty acid dimer: 10.108 g (0.0177 mole).

2. Second step:
Irganox 1010 antioxidant: 0.2 g,
hypophosphorous acid in 50% aqueous solution: 0.04 g
polyoxypropylenediamine Etherdiamine MG 420: 7.35 g (0.01615 mole),
polyoxypropylenediamine Etherdiamine 2000: 3.17 g (0.001535 mole).

A flexible but opaque polymer was obtained, with two phases revealed by electron microscopy.

EXAMPLE 7

Copolyetheramide prepared from adipic acid, hexamethylenediamine/polyoxypropylenedicarboxylic acid having a number-average molecular mass of 528 and 3% by weight of chains possessing a molecular mass greater than 1000, and dimer diamine, with a weight composition close to 70/30 (amide blocks/ether blocks):

1. First step:

The following charges were introduced at ambient temperature into the apparatus described in Example 1:
dry adipic acid/hexamethylenediamine salt: 34.78 g (0.1326 mole),
abovementioned polyoxypropylenedicarboxylic acid, marketed by BASF under the name Pluriol E 600: 6.23 g (0.0118 mole).

The reactor was purged with a nitrogen stream, and then, while it remained under a nitrogen atmosphere, stirring was commenced and the temperature of the reaction mixture was raised gradually up to 270° C. over 50 minutes. After 20 minutes of stirring at 270° C., a pressure of $6.65.10^2$ Pa was gradually established over 10 minutes and the reaction mixture was maintained for another 10 minutes at 270° C. at this reduced pressure and then atmospheric pressure was restored. The reaction mass was perfectly transparent.

2. Second step:

The following other charges were introduced into the reaction mixture which was maintained at 270° C.:
Irganox 1010 antioxidant: 0.2 g,
hypophosphorous acid in 50% aqueous solution: 0.04 g,
then, 6.4 g (0.0118 mole) of the dimer diamine marketed by General Mills under the trade name Versamine 52 were added by being poured in steadily.

After pouring had been completed, the reaction mixture was maintained for 20 minutes at 270° C. and then a reduced pressure of $6.65.10^2$ Pa was established and stirring was continued for another 10 minutes at 270° C. at this reduced pressure.

After cooling, a perfectly transparent and homogeneous polymer was obtained which had a melting point of 242.5° C. and a crystallization point on cooling of 199° C.

By way of a comparative test (Test G), Example 7 was reproduced with the same charges, but this time with the polycondensation being carried out in a single step.

TEST G

The reactor was purged with a nitrogen stream and then, while it remained under a nitrogen atmosphere, stirring was commenced and the temperature of the reaction mixture was gradually raised up to 270° C. over 1 hour 15 minutes. The reaction mixture was heterogeneous. The temperature was maintained at 270° C. for an additional hour and a pressure of $13.3.10^2$ Pa was established over 10 minutes. The mixture was stirred further at 270° C. at this reduced pressure for 15 minutes and then atmospheric pressure was restored.

After cooling, the polymer obtained was opaque and heterogeneous and had no mechanical properties.

EXAMPLE 8

Copolyetheramide prepared from adipic acid, dodecamethylenediamine/dimer acid and the polyoxypropylenediamine used in Example 1, with a number-average molecular weight of 455, with a weight composition close to 50/50 (amide blocks/ether blocks):

All of the following charges were introduced at ambient temperature into the apparatus described in Example 1:
adipic acid: 9.41 g (0.0644 mole),
dodecamethylenediamine: 12.90 g (0.0644 mole),
Pripol 1010 fatty acid dimer: 11.53 g (0.02019 mole),
Irganox 1010 antioxidant: 0.2 g,
hypophosphorous acid in 50% aqueous solution: 0.04 g
polyoxypropylenediamine Etherdiamine MG 420: 9.19 g (0.02019 mole).

The reactor was purged with nitrogen and then, while it remained under a nitrogen atmosphere, stirring was commenced and the temperature was raised to 245° C. over 1 hour, 45 minutes. The reaction mixture was maintained under these conditions for 20 minutes and then a pressure of $13.3.10^2$ Pa was gradually established and the mixture was maintained for another 30 minutes at 245° C. at this reduced pressure, and atmospheric pressure was restored.

After cooling, a perfectly homogeneous, very slightly colored polymer was obtained, having a melting point of 188° C. and a crystallization point on cooling of 157° C.

EXAMPLE 9

Copolyetheramide prepared from dodecanedioic acid, hexamethylenediamine/acid dimer and the polyoxypropylenediamine used in Example 1, with a number-average molecular weight of 455, and a weight composition close to 50/50 (amide blocks/ether blocks):

All of the following charges were introduced at ambient temperature into the apparatus described in Example 1:
dodecanedioic acid: 16.66 g (0.07244 mole),
hexamethylenediamine in aqueous solution at a concentration of 32.5% by weight: 25.9 g (0.07244 mole),
Pripol 1010 fatty acid dimer: 12.98 g (0.02273 mole),
Irganox 1010 antioxidant: 0.2 g,
hypophosphorous acid in 50% aqueous solution: 0.04 g,
silicone antifoam marketed by Rhône-Poulenc Specialités Chimiques under the trademark Rhodorsil Si 454: 0.05 cm$^3$,
polyoxypropylenediamine Etherdiamine MG 420: 10.34 g (0.02273 mole).

The reactor was purged with nitrogen and then, while it remained under a nitrogen atmosphere, stirring was commenced and the temperature was raised to 260° C. over 2 hours, 15 minutes. A pressure of $1.33.10^2$ Pa was then established and the reaction mixture was maintained for another 30 minutes at 260° C. at this reduced pressure and atmospheric pressure was re-established.

After cooling, a flexible, translucent, homogeneous polymer was obtained, showing only a single phase when examined by scanning electron microscopy.

By way of a comparative test (Test H), Example 9 was reproduced, this time with the use of a polyoxypropylenediamine with a nonconforming number-average molecular weight of 2065 and with the operation still being carried out in a single step.

TEST H

The procedure was exactly as indicated in Example 9, with the following charges:
dodecanedioic acid: 18.33 g (0.0797 mole),
hexamethylenediamine in aqueous solution at a concentration of 32.5% by weight: 28.78 g (0.0797 mole),
Pripol 1010 fatty acid dimer: 5.49 g (0.00961 mole),
Irganox 1010 antioxidant: 0.25 g,
hypophosphorous acid in 50% weight aqueous solution: 0.04 g,
silicone antifoam:
polyoxypropylenediamine Etherdiamine 2000: 19.85 g (0.00961 mole).

The reaction mixture was highly heterogeneous. After cooling, the polymer obtained was opaque and waxy in appearance and highly heterogeneous.

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A homogeneous, flexible block coolyetheramide having a melting or softening point of at least 150° C., a glass transition temperature, measured at 0% percent humidity, not exceeding −5° C. and a melt viscosity of at least 100 poises, said copolyetheramide being produced in accordance with a process comprising the steps of:
(A) preparing a prepolymer by heating reactants in either:
  (i) a mixture which comprises:
    (a) at least one short-chain saturated aliphatic dicarboxylic acid,
    (c) at least one short-chain saturated primary aliphatic diamine, and
    (d) at least one polymeric diacid, or (d') at least one polymeric primary diamine, or (e') at least one polyoxyalkylenedicarboxylic acid, the proportions of (a) and (c) being such that the numbers of NH$_2$ and COOH groups are equivalent; or (ii) a mixture which comprises:
    at least one salt of said monomers (a)+(c) with the monomer (d) or (d') or (e');
(B) maintaining said prepolymer at a temperature at least equal to the prepolymerization temperature and reacting said prepolymer with, when said prepolymer is produced from said polymeric diacid(s) (d), at least one polyoxyalkylenediamine (e); or, when said prepolymer is produced from said polymeric primary diamine(s) (d'), with (e') at least one polyoxyalkylenedicarboxylic acid; or, when said prepolymer is produced from said polyoxyalkylenedicarboxylic acid(s) (e'), with (d') at least one polymeric primary diamine, said prepolymer being reacted in the presence of (f) a catalytically effective amount of an inorganic oxyacid, or an organic oxyacid other than a carboxylic acid, at least one of the acid functions thereof having an ionization constant pKa, in water at 25° C., not exceeding 4, or an alkali or alkaline earth metal salt of such inorganic or organic oxyacid; and further wherein said polyether (e) or (e') comprises either one or more polyoxyalkylenediamine(s) or one or more polyoxyalkylenedicarboxylic acid(s), each having a number-average molecular weight ranging from 300 to 1200 and at most 20% by weight of the polymer chains thereof having a molecular weight greater than 1200, or a mixture of one or more polyoxyalkylenediamine(s) or of one or more polyoxyalkylenedicarboxylic acid(s) as defined above with at most 20% by weight relative to the mixture, respectively, of one or more polyoxyalkylenediamine(s) or one or more polyoxyalkylenedicarboxylic acid(s), each having a number-average molecular weight greater than 1200; with the proviso that the proportions of (e) or (e') or (d') are also such that the numbers of NH$_2$ and COOH groups are equivalent.

2. A homogeneous, flexible block copolyetheramide having a melting or softening point which is at least 150° C., a glass transition temperature, measured at 0% percent humidity, not exceeding $-5°$ C. and a melt viscosity of at least 100 poises, said copolyetheramide being produced in accordance with a process comprising the steps of:

(A) preparing a prepolymer by heating reactants in either:
(m$_1$): (a) at least one short-chain saturated aliphatic dicarboxylic acid,
(d) at least one polymeric diacid, and
(e) at least one polyoxylkylenediamine; or
(m$_2$): the aforesaid monomer (a),
(d') at least one polymeric primary diamine, and
(e') at least one polyoxyalkylenedicarboxylic acid; or
(m$_3$): (c) at least one short-chain saturated primary aliphatic diamine,
the aforesaid monomer (d), and
the aforesaid monomer (e); or
(m$_4$):
the aforesaid monomer (c),
the aforesaid monomer (d'), and
the aforesaid monomer (e'), the proportions of (d) and (e) or (d') and (e') being such that numbers of NH$_2$ and COOH groups are equivalent;

(B) maintaining said prepolymer at a temperature at least equal to the prepolymerization temperature and reacting said prepolymer with, when said prepolymer is produced from said mixtures (m$_1$) or (m$_2$), the aforesaid monomer (c); or, when said prepolymer is produced from said mixtures (m$_3$) or (m$_4$), the aforesaid monomer (a), said prepolymer being reacted in the presence of (f) a catalytically effective amount of an inorganic oxyacid, or an organic oxyacid other than a carboxylic acid, at least one of the acid functions thereof having an ionization constant pKa, in water at 25° C., not exceeding 4, or an alkali or alkaline earth metal salt of such inorganic or organic oxyacid; and further wherein said polyether (e) and (e') comprises either one or more polyoxyalkylenediamine(s) or one or more polyoxyalkylenedicarboxylic acid(s), each having a number-average molecular weight ranging from 300 to 1200 and not more than 20% by weight of the polymer chains thereof having a molecular weight greater than 1200; or a mixture of one or more polyoxyalkylenediamine(s) or one or more polyoxyalkylenedicarboxylic acid(s) as defined above with at least 20% by weight relative to the mixture, respectively, of one or more polyoxyalkylenediamine(s) or one or more polyoxyalkylenedicarboxylic acid(s), each having a number-average molecular weight greater than 1200; with the proviso that the proportions of (c) or (a) are also such that the numbers of NH$_2$ and COOH groups are equivalent.

3. A homogeneous, flexible block copolyetheramide having a melting or softening point of at least 150° C., and a glass transition temperature, measured at 0% precent humidity, not exceeding $-5°$ C. and a melt viscosity of at least 100 poises, said coplyetheramide being produced in accordance with a process comprising the steps of:

(A) preparing a prepolymer by heating reactants in a mixture of either:
(I):
(a') at least one saturated aliphatic dicarboxylic acid containing from 8 to 12 carbon atoms,
(c') at least one saturated primary aliphatic diamine containing from 2 to 12 carbon atoms,
(d) at least one polymeric diacid or (d') at least one polymeric primary diamine,
(e) at least one polyoxyalkylenediamine when the mixture is produced from said monomer (d) or at least one polyoxyalkylenedicarboxylic acid (e') when the mixture is produced from said monomer (d'), said prepolymer being reacted in the presence of (f) a catalytically effective amount of an inorganic oxyacid, or an organic oxyacid other than a carboxylic acid, at least one of the acid functions thereof having an ionization constant pKa, in water at 25° C., not exceeding 4, or an alkali or alkaline earth metal salt of such inorganic or organic oxyacid; or (II)
(a'') at least one saturated aliphatic dicarboxylic acid containing from 2 to 7 carbon atoms;
(c'') at least one saturated primary aliphatic diamine containing from 8 to 12 carbon atoms, and
the aforesaid monomers (d) or (d') and (e) or (e'); or (III): at least one salt of said monomers (a') and (c'), or at least one salt of said monomers (a'') and (c'') and the aforesaid monomers (d) or (d'), and (e) or (e') and the catalyst (f);

and further wherein said polyether (e) or (e') comprises either one or more polyoxyalkylenediamine(s) or one or more polyoxyalkylenedicarboxylic acid(s), each having a number-average molecular weight ranging from 300 to 1200 and at most 20% by wieght of the polymer chains thereof having a molecular weight greater than 1200, or a mixture of one or more polyoxyalkylenediamine(s) or one or more polyoxyalkylenedicarboxylic acid(s) as defined above with at most 20% by weight relative to the mixture, respectively, of one or more polyoxyalkylenediamine(s) or one or more polyoxyalkylenedicarboxylic acid(s), each having a number-average molecular weight greater than 1200; with the proviso that the proportions of the various monomers are such that the numbers of NH$_2$ and COOH groups are equivalent.

4. The homogeneous copolyetheramide a defined by any of claims 1, 2 or 3, wherein the polymeric diacids (d), whether in the free state or as the polymeric primary diamine (d') thereof, are fatty acid dimers prepared by polymerization and fractionation of compounds comprising 80 to 100% by weight of monomeric fatty acid(s) containing from 16 to 20 carbon atoms and 20 to 0% by weight of at least one of monomeric fatty acid(s) containing from 8 to 15 carbon atoms and monomeric fatty acid(s) containing from 21 to 24 carbon atoms, said acid dimers comprising a difunctional acid fraction which is greater than 94% by weight, a monofunctional acid fraction which is below 1% by weight and a fraction of acid having a functionality greater than 2 which is less than 5% by weight.

5. The homogeneous copolyetheramide as defined by claim 4, wherein the polyoxyalkylenediamines (e) or the polyoxyalkylenedicarboxylic acids (e') have the general formula:

$$X-R_1-(OR_2)_nOR_3-X \quad (I)$$

in which the symbols X denote a $NH_2$ group or a COOH group, the symbols $R_1$, $R_2$ and $R_3$, which may be identical or different, denote straight-chain or branched divalent saturated aliphatic radicals containing from 1 to 10 carbon atoms, the symbol n is a number determined such that the polyethers have the specified molecular weight characteristics; or comprise compounds prepared by reacting a polyoxyalkylenediamine of the formula (I) with a deficiency of a polymeric diacid (d) or of a polyoxyalkylenedicarboxylic acid of formula (I), or compounds prepared by reacting a polyoxyalkylenedicarboxylic acid of the formula (I) with a deficiency of a polymeric primary diamine (d') or of a polyoxyalkylenediamine of formula (I), said reaction compounds of reacton also having the specified molecular weight chracteristics.

6. The homogeneous copolyetheramide as defined by claim 5, said polyoxyalkylenediamines (e) or polyoxyalkylenedicarboxylic acids (e') comprising polyoxypropylene compounds of the formula (I) in which X equals $NH_2$ or COOH and $R_1$ equals $R_2$ equals $R_3$ equals

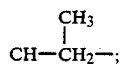

polyoxyethylene compounds of the formula (I) in which X equals $NH_2$ or COOH and $R_1$ equals $R_3$ equals

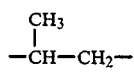

and $R_2$ equals $-CH_2\,CH_2$; or polyoxytetramethylene compounds of the formula (I) in which X equals $NH_2$ or COOH and $R_1$ equals $R_3$ equals

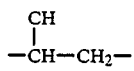

and $R_2$ equals $-CH_2-CH_2-CH_2-CH_2-$.

7. The homogeneous copolyetheramide as defined by any of claims 1, 2 or 3, said catalyst comprising an inorganic oxyacid selected from among sulfurous, sulfuric, hypophosphorous, phosphorous, orthophosphoric or pyrophosphoric acids.

8. The homogeneous copolyetheramide as defined by any of claims 1, 2 or 3, wherein said catalyst is an organic oxyacid comprising an organosulphonic acid of the formula $R_4-SO_3H$ (II) in which $R_4$ is a straight-chain or branched alkyl radical containing from 1 to 6 carbon atoms, a phenyl radical substituted by up to 3 alkyl radicals containing from 1 to 3 carbon atoms, a phenylalkyl radical containing from 1 to 3 carbon atoms in the alkyl moiety and the benzene nucleus of which may be substituted by up to 3 alkyl radicals containing from 1 to 3 carbon atoms, or a naphthyl radical substituted by up to 4 alkyl radicals containing from 1 to 3 carbon atoms; or an organophosphonic acid of the formula $R_5-P(O)(OH)_2$ (III) in which $R_5$ is an alkyl radical, a phenyl radical or a phenylalkyl radical, each of these radicals having the definition given above for $R_4$; or an organophosphinic acid of the formula $R_6R_7-P(O)(OH)$ (IV) in which $R_6$ and $R_7$, which are identical or different, are each a straight-chain alkyl radical containing from 1 to 3 carbon atoms; a phenyl radical or a phenylalkyl radical, both of these latter radicals having the definition given above for $R_4$; or an organophonous acid of the formula $R_8H-P(O)(OH)$ (V) in which $R_8$ is a straight-chain or branched alkyl radical containing from 1 to 4 carbon atoms, with the proviso that an alkyl radical containing 4 carbon atoms cannot be branched; a phenyl radical or a phenylalkyl radical, both of these latter two radicals having the definition given above for $R_4$.

9. The homogeneous copolyetheramide as defined by claim 8, said organic oxyacid comprising hypophosphorous, phosphorous, orthophosphoric, pyrophosphoric, methylphosphonic, phenylphosphonic, benzylphosphonic, dimethylphosphinic, diphenylphosphinic, methylphenylphosphinic, dibenzylphosphinic, methylphosphonous, phenylphosphonous, or benzylphosphonous acid.

10. The homogeneous copolyetheramide as defined by claim 7, said catalyst comprising a sodium or potassium salt of said inorganic oxyacid.

11. The homogeneous copolyetheramide, as defined by any of claims 1, 2 or 3, wherein the amount of oxyacid or salt, expressed as a weight percentage relative to the final copolyetheramide, ranges form 0.01 to 1%.

12. The homogeneous copolyetheramide as defined by claims 1, 2 or 3, the weight proportion of amide blocks therein ranging from 15 to 85%, and the weight proportion of ether blocks therein ranging from 85 to 15%.

13. The homogeneous copolyetheramide as defined by claim 12, the weight proportion of said amide blocks ranging from 40 to 60%, and the weight proportion of said ether blocks ranging from 60 to 40%.

14. The homogeneous copolyetheramide as defined by claim 8, said catalyst comprising a sodium or potassium salt of said organic oxyacid.

15. The homogeneous copolyetheramide as defined by claim 1 wherein said mixtures (i) and (ii) further comprise (b) at least one short-chain saturated alicyclic or aromatic dicarboxylic acid.

16. The homogeneous copolyetheramide as defined by claim 2 wherein said ($m_1$), ($m_2$), ($m_3$) and ($m_4$) further comprise (b) at least one short-chain, saturated alicyclic or aromatic dicarboxylic acid, the proportions of (d), (e) and (b) or (d'), (e') and (b) being such that the numbers of $NH_2$ and COOH groups are equivalent.

17. The homogeneous copolyetheramide as defined by claims 1 or 2 wherein said monomer (a) comprises at least one saturated aliphatic dicarboxylic acid containing from 2 to 12 carbon atoms and the monomer (c) comprises at least one saturated primary aliphatic diamine containing from 2 to 12 carbon atoms.

18. The homogeneous copolyetheramide a defined by claim 3 wherein said mixtures (I) and (II) further comprise (b) at least one short-chain saturated alicyclic or aromatic dicarboxylic acid and wherein said mixture (III) includes at least one salt of said monomers (a'), (b) and (c'), or at least one salt of said monomers (a''), (b) and (c'') and the aforesaid monomers (d) or (d'), and (e) or (e') and the catalyst (f).

19. The homogeneous copolyetheramide as defined by claims 1 or 2, said prepolymer being produced from said monomers (a)+(c)+(d) or (d')+(e').

20. The homogeneous copolyetheramide as define by claim 15, or 16 wherein said monomer (a) comprises at least one saturated aliphatic dicarboxylic acid containing from 2 to 12 carbon atoms, the monomer (b) comprises at least one saturated alicyclic or aromatic dicarboxylic acid containing at most 16 carbon atoms, and the monomer (c) comprises at least one saturated primary aliphatic diamine containing from 2 to 12 carbon atoms.

21. The homogeneous copolyetheramide as defined by claim 15 or 16, said prepolymer being produced from said monomers (a)+(b)+(c)+(d) or (d')+(e').

22. (Amended) The homogeneous copolyetheramide as defined by claim 18, said prepolymer being produced from said monomers (a) or (a')+(b)+(c') or (c'')+(d) or (d')+(e) or (e').

* * * * *